United States Patent
Lee et al.

(10) Patent No.: US 9,109,693 B2
(45) Date of Patent: Aug. 18, 2015

(54) METHOD OF CONTROLLING SHIFTING OF GEARS IN HYBRID VEHICLE

(71) Applicant: Hyundai Motor Company, Seoul (KR)

(72) Inventors: Soo Bang Lee, Seoul (KR); Tai Jin Jung, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/458,725

(22) Filed: Aug. 13, 2014

(65) Prior Publication Data

US 2015/0142282 A1  May 21, 2015

(30) Foreign Application Priority Data

Nov. 20, 2013  (KR) .......................... 10-2013-0141462

(51) Int. Cl.
  *B60W 10/02*  (2006.01)
  *F16H 61/02*  (2006.01)
(52) U.S. Cl.
  CPC .................................. *F16H 61/0213* (2013.01)
(58) Field of Classification Search
  None
  See application file for complete search history.

(56) References Cited

U.S. PATENT DOCUMENTS

2010/0250074 A1*  9/2010  Hirasako et al. ................. 701/55
2013/0210575 A1*  8/2013  Kumazaki et al. .............. 477/20

FOREIGN PATENT DOCUMENTS

| JP | 2010-143426 A | 7/2010 |
| JP | 2010-149559 A | 7/2010 |
| JP | 2013-126812 A | 6/2013 |
| KR | 10-2010-0062635 A | 6/2010 |
| KR | 1020100064645 A | 6/2010 |
| KR | 10-1000417 B1 | 12/2010 |
| KR | 10-2011-0139953 A | 12/2011 |
| KR | 10-2012-0025967 A | 3/2012 |

* cited by examiner

*Primary Examiner* — Justin Holmes
(74) *Attorney, Agent, or Firm* — Morgan, Lewis & Bockius LLP

(57) ABSTRACT

A method of controlling the shifting of gears in a TMED-type hybrid vehicle may include a stage in which, in a case where it is required that a power-on upshift operation is performed simultaneously when engagement of an engine clutch is carried out in order to convert the driving mode from an electric vehicle (EV) driving mode to hybrid-electric vehicle (HEV) driving mode, simultaneously performs the engagement of the engine clutch and the shift operation, thereby improving acceleration and shifting performances and providing a quick driving response for a driver.

8 Claims, 3 Drawing Sheets

METHOD OF CONTROLLING SHIFTING OF GEARS IN HYBRID VEHICLE

CROSS REFERENCE TO RELATED APPLICATION

The present application claims priority of Korean Patent Application Number 10-2013-0141462 filed on Nov. 20, 2013, the entire contents of which application are incorporated herein for all purposes by this reference.

BACKGROUND OF THE INVENTION

1. Field of the Invention

The present invention relates, in general, to a method of controlling the shifting of gears in a hybrid vehicle that is of a type of transmission mounted electric device (TMED) using an automatic transmission or a double clutch transmission (DCT), such that a power-on upshift operation can be carried out simultaneously when the driving mode of the hybrid vehicle is converted from an electric vehicle (EV) mode to a hybrid-electric vehicle (HEV) mode.

2. Description of Related Art

Generally, transmission mounted electric device (TMED)-type hybrid vehicles have an engine clutch for power-connection between an engine and a motor, and, when converted from electric vehicle (EV) driving mode to hybrid-electric vehicle (HEV) driving mode, should start the engine and engage the engine clutch such that power from the engine is transmitted to the transmission.

In such a TMED-type hybrid vehicle having the engine clutch, when a driver depresses an acceleration pedal so as to perform an upshift operation (i.e. power-on upshifting operation) while the driving mode of the hybrid vehicle is converted from the EV driving mode to the HEV driving mode, according to the related art, the EV-HEV conversion and the power-on upshifting operation are sequentially carried out in the order named or reversely due to complexity of control.

FIG. 1 is a graph showing a relationship of rpms of the engine and the motor over time when the engine clutch is first engaged and then the shift operation is performed, in the case where engagement of the engine clutch and the shift operation are required at the same time. In the graph, when upshifting to a high gear as a target gear is set after the engine starts in response to an engine-on signal is generated, a shift-prevention BIT to prevent shift operation is activated until the engine clutch is engaged and locked up, since the engine clutch is not yet engaged, and then when the shift-prevention bit is deactivated, the actual shift-performing bit to perform an actual shift operation is activated to complete the shift operation.

Although the above-mentioned control method can avoid complexity of control with separate implementation of engagement of the engine clutch from the shift operation, the shift operation is carried out after the engagement of the engine clutch and thus is delayed, so that an increase in torque of driving wheels is also delayed, reducing the acceleration performance of a vehicle. In addition, such a time lag to start the shift operation may cause poor performance in terms of noise, vibration, and harshness (NVH) of a vehicle.

In the meantime, FIG. 2 is a graph showing a relationship of rpms of the engine and the motor over time when shift operation is first carried out and then engagement of the engine clutch is performed, in the case where the engagement of the engine clutch and the shift operation are required at the same time. In the graph, when the engine starts in response to an engine-on signal generated after upshift to high gear as a target gear is set, the shift operation is first performed such that actual shift-performing bit is first activated while deactivating shift-prevention bit, and then when the actual shift-performing bit is deactivated by the completion of the shift operation, the engine clutch is engaged locked up.

Although the above-mentioned control method first performs the shift operation so that an increase in torque of driving wheels of a vehicle can be performed quickly, a maximum torque for rpms of the motor is limited, so a desired torque can be provided to the driving wheels, provided that the engine clutch is engaged. Thus, a difference in torque of driving wheels occurs due to the process of the shift operation and the engagement of the engine clutch, degrading linear acceleration performance. In addition, like in the former case of shifting after the engagement of the engine clutch, a time lag to accelerate a vehicle occurs, and the engine is unnecessarily operated during the shift operation, degrading fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling the shifting of gears in a TMED-type hybrid vehicle, which, in a case where it is required that a power-on upshift operation is performed simultaneously when engagement of an engine clutch is carried out in order to convert driving mode from electric vehicle (EV) driving mode to hybrid-electric vehicle (HEV) driving mode, simultaneously performs the engagement of the engine clutch and the shift operation, thereby improving acceleration and shifting performances and providing a quick response of driving of a vehicle by manipulation of a driver.

In an aspect of the present invention, a method of controlling shifting of gears in a hybrid vehicle, may include an entry condition judgment stage of determining both whether a power-on upshift demand may have been generated while the vehicle is being used in an electric vehicle (EV) driving mode, being in a state where an actual shifting of the vehicle is able to be initiated, and whether an engine-on demand may have been generated, a time judgment stage of, when an engine and a motor may have a synchronized rpm, determining whether a current point is prior to a predetermined reference point within a shift-preparation period, a release compensation stage of when the current point may have been determined in the time judgment stage to be prior to the reference point, applying hydraulic pressure for engagement of an engine clutch and at a same time, compensating release-hydraulic pressure of a gearshift element, taking account of the applied hydraulic pressure of the engine clutch, an actual shifting judgment stage of, when the current point may have been determined in the time judgment stage to follow the reference point, determining whether the actual shifting may have been initiated, and an apply compensation stage of, when the actual shifting may have been determined in the actual shifting judgment stage to be initiated, applying hydraulic pressure for engagement of the engine clutch, and compensating applied-hydraulic pressure of the gearshift element, taking account of the applied hydraulic pressure of the engine clutch.

In the release compensation stage, the release-hydraulic pressure is compensated with a compensating value obtained from a data map predefined according to the hydraulic pressure of the engine clutch, an rpm of the motor, and an rpm gradient of the motor.

In the apply compensation stage, the applied-hydraulic pressure is compensated with a compensating value obtained from a data map predefined according to the hydraulic pressure of the engine clutch, an rpm of the motor, and an rpm gradient of the motor.

During the shift-preparation period, a target rpm of the engine adopts an rpm determined as in current gear, during the actual shift period, the target rpm adopts an rpm variable according to a predetermined gradient for input torque and output speed of a transmission, and after the actual shift period, the target rpm adopts an rpm determined as in a target gear.

The reference point in the time judgment stage is set within a time range that passed from approximately 50% to approximately 90% of a total of the shift-preparation period that is a torque phase in which only a torque of gearshift elements varies.

In another aspect of the present invention, a method of controlling shifting of gears in a hybrid vehicle may include a stage of, in a case where conversion of an electric vehicle (EV) driving mode to a hybrid-electric vehicle (HEV) driving mode and a power-on upshift operation are demanded at a same time, when a synchronized point at which an engine and a motor may have a synchronized rpm is prior to a reference point within a shift-preparation period being a torque phase, simultaneously performing a shift operation while engaging and locking up an engine clutch and compensating release-hydraulic pressure of a release-side gearshift element, and when the synchronized point follows the reference point, after an actual shift period being an inertia phase starts, simultaneously performing the shift operation while engaging and locking up the engine clutch and compensating applied-hydraulic pressure of an engaging-side gearshift element.

The release-hydraulic pressure and the applied-hydraulic pressure are compensated with compensating values respectively obtained from data maps predefined according to the hydraulic pressure of the engine clutch, an rpm of the motor, and an rpm gradient of the motor.

The reference point is set within a time range that passed from approximately 50% to approximately 90% of a total of the shift-preparation period that is a torque phase in which only a torque of gearshift elements varies.

According to the present invention, in a case where it is required that a power-on upshift operation is performed simultaneously when engagement of an engine clutch is carried out in order to convert the driving mode from electric vehicle (EV) driving mode to hybrid-electric vehicle (HEV) driving mode, the engagement of the engine clutch and the shift operation are simultaneously performed, thereby improving acceleration and shifting performances and providing a quick response of driving of a vehicle to a driver.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
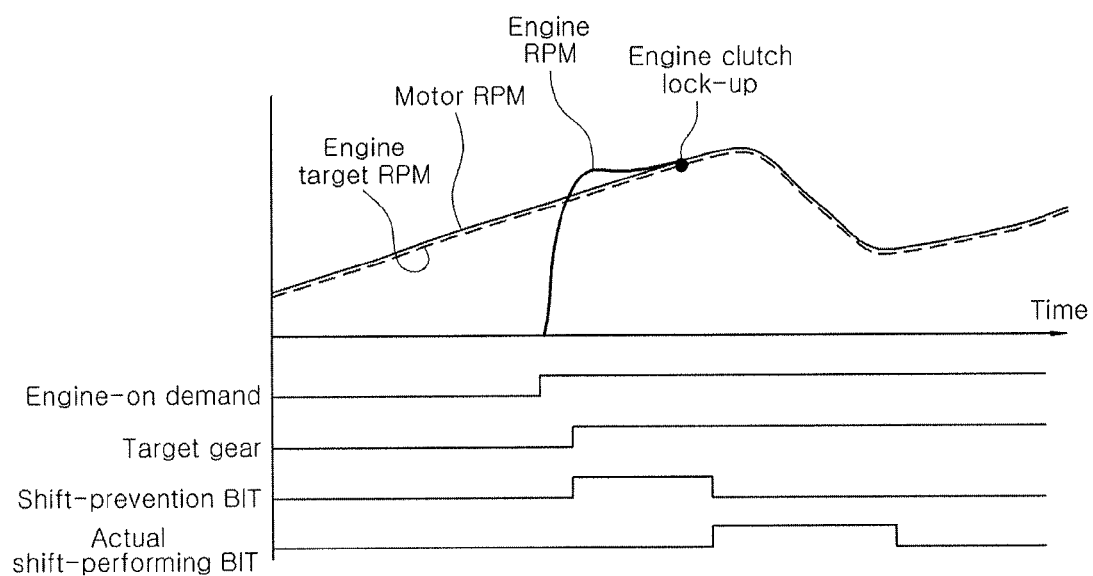
FIG. 1 is a graph showing a status in which, in the case where engagement of an engine clutch and a shift operation are required at the same time, the engagement of the engine clutch is first carried out and then the shift operation is performed according to the related art.
Figure 2:
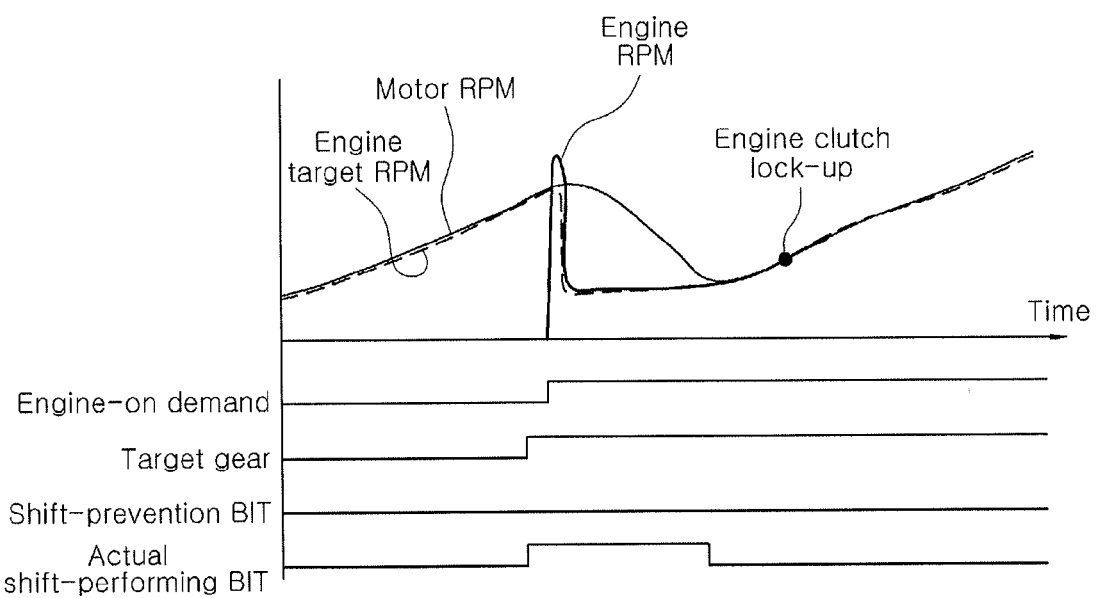
FIG. 2 is a graph showing a status in which, in the case where engagement of an engine clutch and a shift operation are required at the same time, the shift operation is first performed and then the engagement of the engine clutch is carried out according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, preferred embodiments of the present invention will be described in detail with reference to the accompanying drawings.

Figure 3:
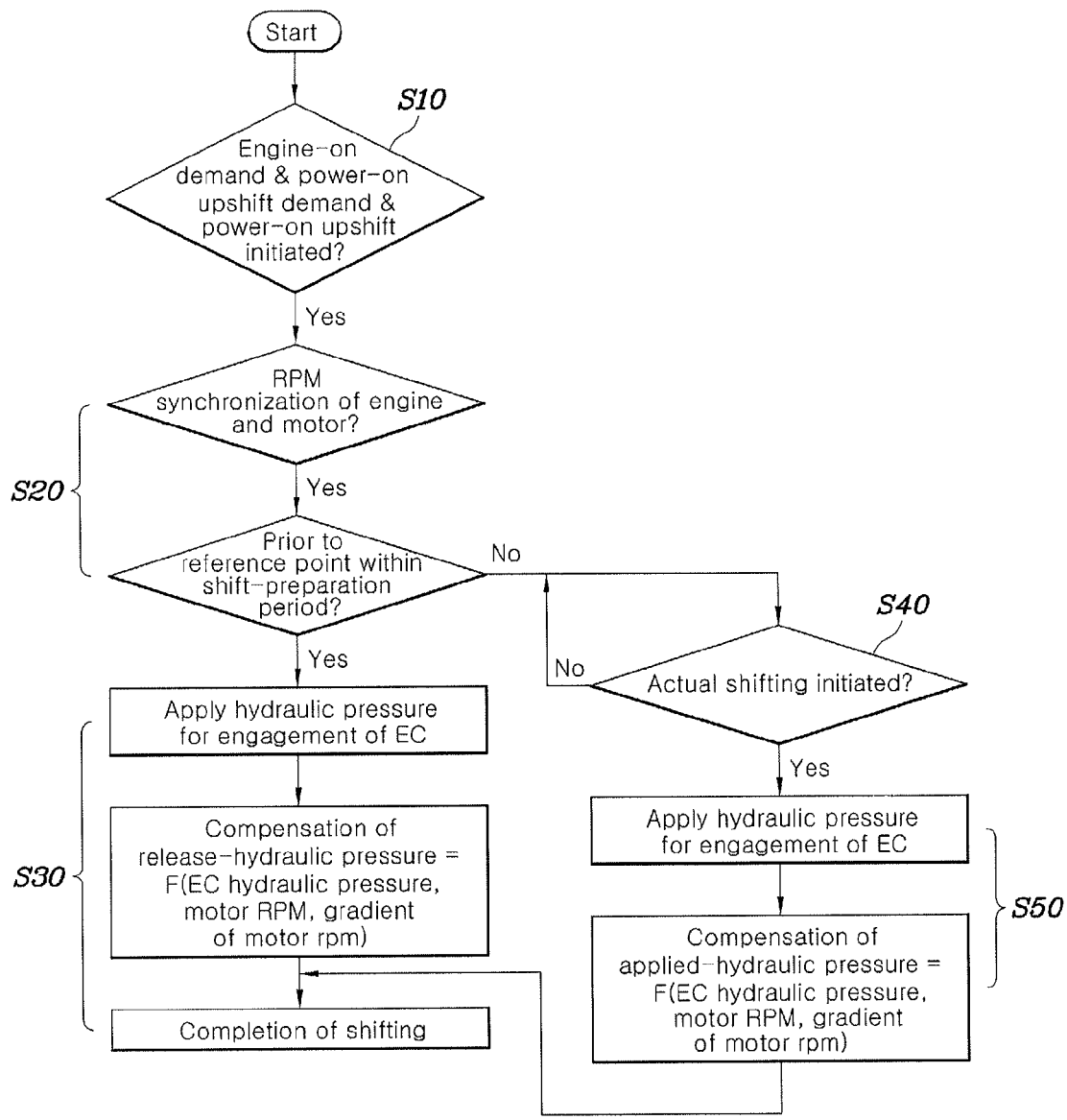
FIG. 3 is a flow chart showing a method of controlling the shifting of gears in a hybrid vehicle according to an exemplary embodiment of the present invention.
Figure 4:
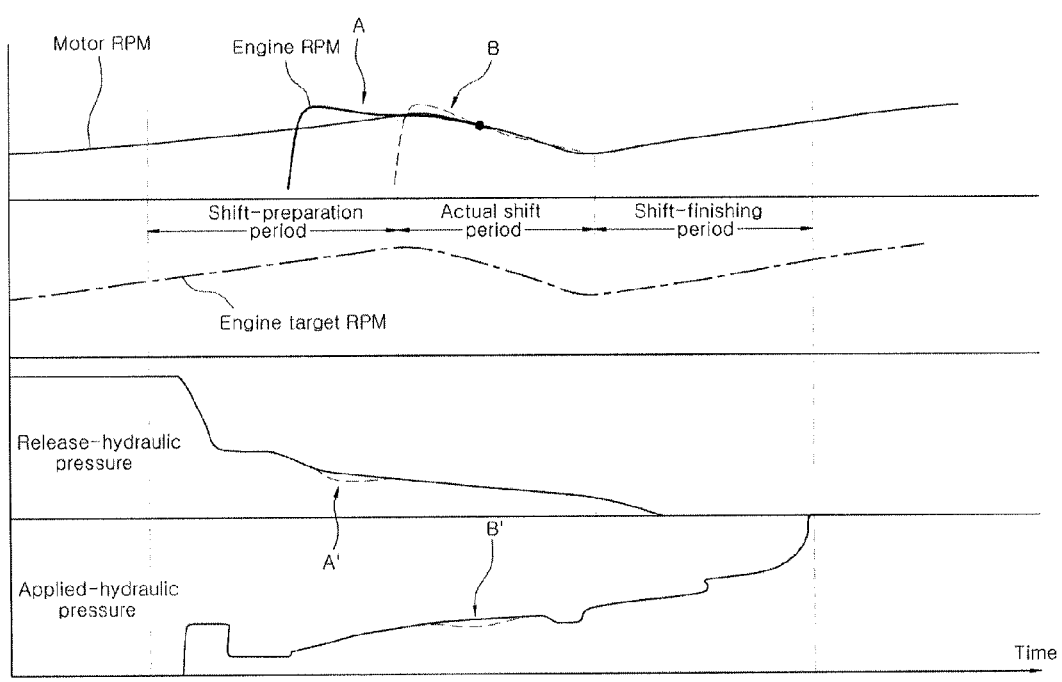
FIG. 4 is a graph showing the procedure of the shift-control method.

Referring to FIGS. 3 and 4, in an exemplary embodiment, a method of controlling the shifting of gears in a hybrid vehicle includes: an entry condition judgment stage S10 of determining both whether a power-on upshift demand has been generated while the vehicle is being used in an electric vehicle (EV) driving mode, being in a state where an actual shifting of the vehicle is able to be initiated, and whether an engine-on demand has been generated, a time judgment stage S20 of, when an engine and a motor have a synchronized rpm, determining whether a current point is prior to a predetermined reference point within a shift-preparation period, a release compensation stage S30 of, when the current point has been determined in the time judgment stage S20 to be prior to the reference point, applying hydraulic pressure for engagement of an engine clutch (EC) and at the same time, compensating release-hydraulic pressure of a gearshift element, taking account of the applied hydraulic pressure of the engine clutch, an actual shifting judgment stage S40 of, when the current point has been determined in the time judgment stage S20 to follow the reference point, determining whether the actual shifting has been initiated, and an apply compensation stage S50 of, when the actual shifting has been determined in the actual shifting judgment stage S40 to be initiated, applying hydraulic pressure for engagement of the engine clutch, and compensating applied-hydraulic pressure of the gearshift element, taking account of the applied hydraulic pressure of the engine clutch.

That is to say, according to the method of the present invention, in a case where conversion of an electric vehicle (EV) driving mode to a hybrid-electric vehicle (HEV) driving mode and the power-on upshift operation are demanded at the same time, when a synchronized point at which the engine and the motor have a synchronized rpm is prior to the reference point within the shift-preparation period being a torque phase, the shift operation is simultaneously performed while engaging and locking up of the engine clutch is carried out and release-hydraulic pressure of a release-side gearshift element is compensated, and when the synchronized point follows the reference point, after the actual shift period being an inertia phase starts, the shift operation is simultaneously performed while engaging and locking up of the engine clutch is carried out and applied-hydraulic pressure of an engaging-side gearshift element is compensated.

In the entry condition judgment stage S10, since an engine-on demand is required to convert the driving mode of the hybrid vehicle from the EV driving mode to the HEV driving mode, it is expected that the generation of the engine-on demand is a measure to engage the engine clutch, which power-connects the engine, the motor, and a transmission, to convert the driving mode to the HEV driving mode. Thus, according to the determination of the generation of both the engine-on demand and the power-on upshift demand, which is demanded to upshift as a driver depresses an acceleration pedal, it is then determined that it is possible to carry out an actual shift operation. That is, when the actual shift operation is able to be initiated, it is determined that the situation satisfies requirements of simultaneously carrying out the engagement of the engine clutch and the power-on upshift operation according to the subsequent control as follows.

That is, in the entry condition judgment stage S10, it is determined whether the power-on upshift demand has been generated, whether the situation reaches the status that the actual shifting can be carried out, and whether the engine-on demand has been generated, and when all of the determination results are positive, the method proceeds to the subsequent stage.

Here, in the case where the engagement of the engine clutch for conversion from the EV mode to the HEV mode, and the power-on upshift operation are simultaneously needed, the present invention can perform the above requirements without activating the shift-prevention bit as in the related art.

When the requirements in the entry condition judgment stage S10 are all satisfied, the method proceeds to the time judgment stage S20 which is carried out based on the fact that the engine and the motor have been synchronized in their rpms. The synchronized point becomes a reference point at which the release compensation stage S30 or the apply compensation stage S50 will be carried out.

That is, when the synchronized point is prior to the reference point, the release compensation stage S30 is carried out, and when the synchronized point follows the reference point, the apply compensation stage S50 is carried out.

The reference point in the time judgment stage S20 is preferably set within a time range that passed from 50% to 90% of the total shift-preparation period that is a torque phase in which only the torque of gearshift elements varies.

That is, as shown in FIG. 4, the shift operation in an exemplary embodiment of the present invention is carried out through three consecutive periods, including a shift-preparation period, an actual shift period, and a shift-finishing period.

Here, the shift-preparation period refers to a torque phase in which only a reactive torque in gearshift elements which are just disengaged from an engaged state, and newly engaged gearshift elements, in an automatic transmission or a double clutch transmission (DCT), vary, and the actual shift period refers to an inertia phase in which an actual rpm ratio varies. In addition, the reference point is set to a time range that passed from 50% to 90% of the torque phase after started.

Although the shift operation and the engagement of the engine clutch after the engine and the motor are synchronized in their rpms will be carried out simultaneously, respective initiating times may not be completely identical and respective duration times may be different, so that, the present invention performs a different control stage depending upon the fact which period of the shift operation the synchronized point, at which the engine and the motor are synchronized in their rpms, belongs to.

According to an exemplary embodiment of the present invention, when the synchronized point of the engine and the motor is prior to the reference point within the shift-preparation period, hydraulic pressure is applied to engage and lock up the engine clutch, and the release compensation stage S30 is carried out to compensate release-hydraulic pressure of a release-side gearshift element, which is required to deal well with a change according to the engagement of the engine clutch, with a first compensating value which is obtained from a first data map which is predefined in response to the hydraulic pressure of the engine clutch, the rpm of the motor, and an rpm gradient of the motor.

That is, under the control on the release hydraulic pressure with the compensating value obtained from the data map in which the change responding to the engagement of the engine clutch is reflected by pre-performed experiments and analyses, while applying hydraulic pressure to engage the engine clutch, a stable shift control operation is carried out, and even when an existing learning function of a controller is still adopted, a problem due to disturbance does not occur.

On another hand, when the synchronized point of rpms between the engine and the motor follows the reference point, the actual shifting judgment stage S40 is carried out to check whether an actual shift operation has been initiated, and then the apply compensation stage S50 is carried out within the actual shift period.

In the apply compensation stage S50, the applied-hydraulic pressure of an applied-side gearshift element is compensated with a second compensating value obtained from a second data map predefined according to the hydraulic pressure of the engine clutch, an rpm of the motor, and an rpm gradient of the motor. Likely in the release gearshift elements, the applied-hydraulic pressure is compensated using the data map predefined according to the hydraulic pressure of the engine clutch, the rpm of the motor, and the rpm gradient of the motor, this stage enables a stable shift control and avoids the occurrence of the problem caused from disturbance even when the existing learning function of the controller is still being adopted.

According to an exemplary embodiment of the present invention, the reason why the control operation is performed such that, when the synchronized point of the motor and the engine is prior to the shift-preparation period, the release hydraulic pressure is compensated, and at the subsequent actual-shift period, the applied-hydraulic pressure compensation is performed, is because a major factor to affect the shift operation in the shift-preparation period is the release-hydraulic pressure, and a major factor to affect the shift operation in the actual shift period is the applied-hydraulic pressure.

For reference, in FIG. 4, for the compensating control on the release-hydraulic pressure, section A is indicated as 'A", since the synchronized point of the engine and the motor is prior to the reference point within the shift-preparation period, and for the compensating control on the applied-hydraulic pressure in the actual shift period, section B is indicated as 'B", since the synchronized point follows the reference point.

In the meantime, in the process of performing the simultaneous control on the shift operation and the engagement of the engine clutch, it is more practical that the establishment of a target rpm of an engine that becomes a reference for the former control operation is performed such that during the shift-preparation period, the target rpm adopts an rpm calculated as in current gear, during the actual shift period, the target rpm adopts an rpm variable according to a predetermined gradient for input torque and output speed of a transmission, and after the actual shift period, the target rpm adopts an rpm calculated as in a target gear.

For reference, although the exemplary embodiments have been described with reference to gearshift elements actuated with hydraulic pressure of an automatic transmission as a transmission mechanism adapts, so release-hydraulic pressure and applied-hydraulic pressure have been used, in a case of DCT or the like using a dry-type clutch, a transmission torque of a release-side clutch and a transmission torque of an engaging-side clutch may be used as well.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling shifting of gears in a hybrid vehicle having a controller, the method comprising:
   an entry condition judgment stage of determining both whether a power-on upshift demand has been generated while the vehicle is being used in an electric vehicle (EV) driving mode, being in a state where an actual shifting of the vehicle is able to be initiated, and whether an engine-on demand has been generated;
   a time judgment stage of, when an engine and a motor have a synchronized rpm, determining whether a current point is prior to a predetermined reference point within a shift-preparation period;
   a release compensation stage of, when the current point has been determined in the time judgment stage to be prior to the reference point, applying hydraulic pressure for engagement of an engine clutch and at a same time, compensating release-hydraulic pressure of a gearshift element, with a first compensating value obtained from a first data map predefined according to at least the applied hydraulic pressure of the engine clutch;
   an actual shifting judgment stage of, when the current point has been determined in the time judgment stage to follow the reference point, determining whether the actual shifting has been initiated; and
   an apply compensation stage of, when the actual shifting has been determined in the actual shifting judgment stage to be initiated, applying hydraulic pressure for engagement of the engine clutch, and compensating applied-hydraulic pressure of the gearshift element, with a second compensating value obtained from a second data map predefined according to at least the applied hydraulic pressure of the engine clutch.

2. The method of claim 1, wherein in the release compensation stage, the release-hydraulic pressure is compensated with the first compensating value obtained from the first data map predefined according to the hydraulic pressure of the engine clutch, an rpm of the motor, and an rpm gradient of the motor.

3. The method of claim 1, wherein in the apply compensation stage, the applied-hydraulic pressure is compensated with the second compensating value obtained from the second data map predefined according to the hydraulic pressure of the engine clutch, an rpm of the motor, and an rpm gradient of the motor.

4. The method of claim 1, wherein during the shift-preparation period, a target rpm of the engine adopts an rpm determined as in current gear, during the actual shift period, the target rpm adopts an rpm variable according to a predetermined gradient for input torque and output speed of a transmission, and after the actual shift period, the target rpm adopts an rpm determined as in a target gear.

5. The method of claim 1, wherein the reference point in the time judgment stage is set within a time range that passed from approximately 50% to approximately 90% of a total of the shift-preparation period that is a torque phase in which only a torque of gearshift elements varies.

6. A method of controlling shifting of gears in a hybrid vehicle having a controller, the method comprising:
   a stage of, in a case where conversion of an electric vehicle (EV) driving mode to a hybrid-electric vehicle (HEV) driving mode and a power-on upshift operation are demanded at a same time, when a synchronized point at which an engine and a motor have a synchronized rpm is prior to a reference point within a shift-preparation period being a torque phase, simultaneously performing a shift operation while engaging and locking up an engine clutch and compensating release-hydraulic pressure of a release-side gearshift element, and when the synchronized point follows the reference point, after an actual shift period being an inertia phase starts, simultaneously performing the shift operation while engaging and locking up the engine clutch and compensating applied-hydraulic pressure of an engaging-side gearshift element.

7. The method of claim 6, wherein the release-hydraulic pressure and the applied-hydraulic pressure are compensated with compensating values respectively obtained from data maps predefined according to the hydraulic pressure of the engine clutch, an rpm of the motor, and an rpm gradient of the motor.

8. The method of claim 6, wherein the reference point is set within a time range that passed from approximately 50% to approximately 90% of a total of the shift-preparation period that is a torque phase in which only a torque of gearshift elements varies.

* * * * *